C. & B. D. Tabor,
Sharpening Reciprocating Saws.
N° 22,040.  Patented Nov. 9, 1858.
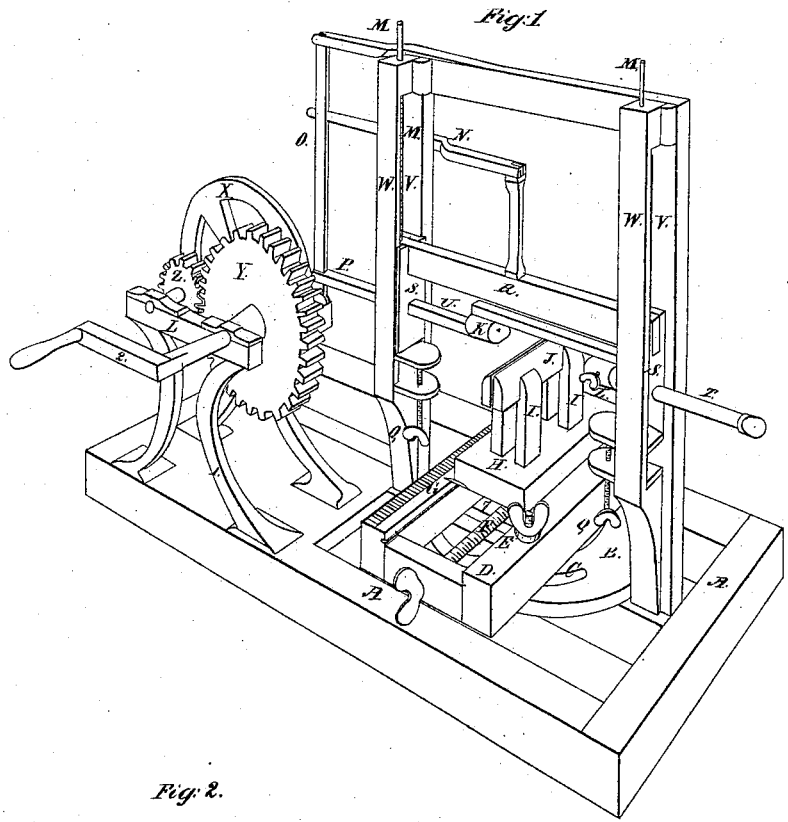
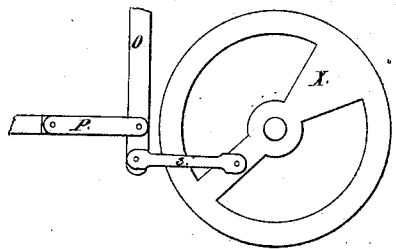
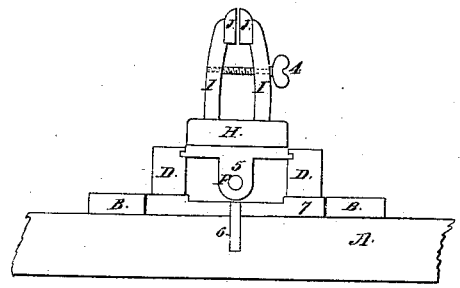
Witnesses:
E. D. Loveridge
N. P. Loveridge
Inventor:
Calvin Tabor
Byron D. Tabor

UNITED STATES PATENT OFFICE.

CALVIN TABOR AND BYRON D. TABOR, OF ISCHUA, NEW YORK.

MACHINE FOR FILING SAWS.

Specification of Letters Patent No. 22,040, dated November 9, 1858.

*To all whom it may concern:*

Be it known that we, CALVIN TABOR and BYRON D. TABOR, of the town of Ischua, county of Cattaraugus, and State of New York, have invented a new and useful Machine for Filing Saws; and we do hereby declare that the following is a full, clear, and exact description of the construction and operation of the same, reference being had to the annexed drawings, making a part of this specification, in which—

Figure 1 is a perspective view. Fig. 2 is a view or elevation of the balance wheel or crank. Fig. 3 is a section of the apparatus for holding, turning and moving the saw.

The following is a description of the mode of constructing the machine.

A, A, is a horizontal frame of wood upon which are erected the posts V, V, and also the cast iron frame 1, 1.

B, is a circular platform filling the space between the posts V, V, and fastened to the frame A.

7, in Figs. 1 and 3 is a block turning on a pivot 6, Fig. 3, and inside of the circular platform, B, and carrying with it the lower carriage D.

The upper carriage H, is composed of a block in which are inserted the upright standards I, I, which hold or support the jaws J, J. The carriage H, runs in grooves in the sides of the carriage D, D, and is moved backward and forward by the screw F, working in the nut, 5, Fig. 3.

The carriage D, revolves on the pivot 6, Fig. 3, and is fastened at any required angle by the clamp screw E, moving in the slot C.

W, W, are upright pieces fastened to the posts V, V, and leaving a space between them, by shoulders, in which space works the frame S, S.

S, S, R, is a frame, the parts S, S, working in the space between the posts V, W, and held there by returns on the face of the posts.

N, is a lever fastened to the post V, for the purpose of raising the frame S, S, R. M, M, M, are spiral springs for holding said frame down to its position.

W, K, T, is a slide for holding the file and runs through the frame S, S. The part T, moves backward and forward in K for the purpose of receiving and removing the file and is held to its position by the thumb screw L. The slide U, K, T, holding the file is driven backward and forward by its connections P, 3, and O, with the balance wheel X, Fig. 2, which balance wheel X is driven by the pinion and driving wheels Z and Y.

The rod O, in Figs. 1 and 2 is for the purpose of keeping the rods P, and N, nearly in the same line with each other for the purpose of lessening the friction of the rod N, with its bearing in passing through the frame S.

The set screws Q, Q, are for the purpose of regulating the height of the frame S, S, R.

The index G, is attached to the carriage H, for the purpose of regulating or equalizing the size of the teeth of the saw by the scale on the side of the carriage D.

The machine is operated in the following manner: First a file is inserted between the jaws K, K, and held by shoving up the part T, which is fastened to its place by the thumb screw L. The saw is then to be inserted between the jaws J, J, and held by the thumb screw 4, Fig. 3. The carriage H is to be moved by the screw F until one end of the saw is brought under the file. The necessary angle is to be given to the tooth by turning the carriage D, D, partly around and clamping it by the screw E. The file is then propelled by turning the crank 2, in Fig. 1. When the first tooth is filed the file is to be raised by means of the lever N, and the saw then moved to the next tooth by means of the screw F when the file is to be let down and so on until the saw is filed.

What we claim as our invention and wish to secure by Letters Patent, is—

The use of the file carrier and pressure frame, as set forth in connection with the carriage, clamping jaws and revolving platform, when constructed and operated as specified.

CALVIN TABOR.
BYRON D. TABOR.

Witnesses:
EDWARD D. LOVERIDGE,
J. DOUGLAS BROWN.